United States Patent [19]

Barnett

[11] Patent Number: 4,775,561
[45] Date of Patent: Oct. 4, 1988

[54] ENCASEMENT OF TANKS WITH FIBER-RESIN COMPOSITES

[75] Inventor: Frank L. Barnett, Stow, Ohio

[73] Assignee: Robert W. Norris, Streetsboro, Ohio

[21] Appl. No.: 117,949

[22] Filed: Nov. 9, 1987

[51] Int. Cl.⁴ .............................................. B32B 1/02
[52] U.S. Cl. ................................. 428/35; 29/402.09;
156/91; 156/94; 156/213; 156/307.7; 206/335;
264/36; 428/63; 428/122; 428/192
[58] Field of Search .............. 29/402.09; 52/579, 804;
156/91, 94, 213, 307.7; 206/335; 220/452, 455;
264/36; 428/35, 63, 122, 192

[56] References Cited

U.S. PATENT DOCUMENTS

| | | | |
|---|---|---|---|
| 1,930,345 | 10/1933 | Lewis | 52/804 |
| 2,924,546 | 2/1960 | Shaw | |
| 3,193,424 | 7/1965 | Scott | |
| 3,622,371 | 11/1971 | Sparks | |
| 4,662,959 | 5/1987 | Morgan | 156/94 |
| 4,702,785 | 10/1987 | Burger | 156/91 |

*Primary Examiner*—Robert A. Dawson
*Attorney, Agent, or Firm*—Frederick K. Lacher; Olaf Nielsen

[57] ABSTRACT

A flanged tank (1) is sealed by a covering of fiber-resin composites (16,17). At each tank flange (4,5), the composite (17) extends continuously from a point on one tank half shell (2), across the flange (4,5), to a point on the other tank half shell (3). The composite (17) is pressed and conformed to the flange surfaces (9) and flange end (10) by means of a clamping member (30) incorporated with the composite (17) by curing.

5 Claims, 2 Drawing Sheets

ENCASEMENT OF TANKS WITH FIBER-RESIN COMPOSITES

TECHNICAL FIELD

The invention is broadly directed to a process for covering an edge of a container with a continuous fiber-resin composite clamped by and covered with a resilient clamping channel, and the product of that method.

BACKGROUND OF THE INVENTION

Tanks, in particular metal tanks for fuel such as gasoline in automotive use, are susceptible to rust, deterioration, physical damage, and especially failure at the seams or flanges where formed portions of the tank are joined together. The welds, brazings, or other fusions of such seams are the locations of a majority of tank failures.

Historically, leaky tanks are removed from the vehicle, purged of fuel and fumes, then welded or brazed or otherwise plugged where necessary; a procedure which frequently costs hundreds of dollars.

Lately it has become practice to cover the entire tank, irrespective of the location of a failure, with a combination of inorganic fibers and resin. In this process, the combination is generally applied to the cleaned tank exterior by covering it with a self-curing resin in somewhat liquid form; then applying, for example, glass fiber in the form of a mat of random fibers; or as a woven glass fabric; or indeed as loose roving; then applying additional resin, if necessary. Alternatively, the fiber material may be applied first, followed by a thorough wetting with resin. Again, as a third method, a previously resin-wetted fiber mat may be applied.

In any of the application methods above, the combination is conformed to the tank by splicing and/or cutting and fitting at corners. Pressing and/or rolling complete the laying down of the combination. It will be understood that the layers of the combination may be applied to cover especially weak, deteriorated or extensive areas.

The resin may be poured, brushed or sprayed on. In order to promote the curing, or hardening, of the resin, and thus create a finished product ready for use, a catalyst and a suitable accelerator are generally mixed into the liquid resin to establish a mixture having a viscosity preferred for handling, and to arrive at a desirable curing time.

An example of repairs such as generally described above may be seen in the 1960 U.S. Pat. No. 2,924,546 to Shaw, wherein a repair is disclosed as a tape combination applied to damaged pipe. In the 1961 U.S. Pat. No. 3,622,371 to Sparks, there is disclosed coverings comprised of a thermosetting epoxy resin, a curing agent and glass fibers, adhered to a partially sandblasted surface.

Neither of the above patents addresses the problems encountered in adequately covering the most difficult-to-seal portion of a tank; namely, the area represented by the outwardly extending metal flanges where the tank half shells are joined.

In the 1987 U.S. Pat. No. 4,662,959, Morgan proposes to close the area by trimming each of the resin-inpregnated glass fiber mats at the edge of the flange and then manually pinching together the open ends of the mats.

Thus, neither the Shaw U.S. Pat. No. 2,249,546 nor the Sparks U.S. Pat. No. 3,622,371 solves any edge sealing problem, while the Morgan U.S. Pat. No. 4,662,959 neither envisions nor suggests a method which creates a continuous fiber-resin joint without open ends, including an incorporated channel-clamping member.

SUMMARY OF THE INVENTION

The present invention has for its object the provision of a method for creating a fluid-tight covering around a tank, particularly around its protruding flanges, by placing a layer of an uncured fiber-resin combination in an unbroken path from a first location on one tank half shell, across the end of the flange, and thereafter to a second location on the other tank half shell, thereafter permanently clamping by means of a channel member, and incorporating the channel meber with the fiber-resin combination and the flange by curing.

Another object of the invention is to provide a continuous, unbroken fiber-resin layer across the flange, then tightly enclosing the flange and layer with a U-shaped, resilient channel member and curing.

Yet another object of the invention is to create a cured fiber-resin composite covering for a fuel tank having sealed flanges continuously covered and permanently clamped.

These and other objects of the invention will become evident from the embodiment hereinafter discussed and claimed.

DESCRIPTION OF THE PREFERRED EMBODIMENT

Reference is now made to the preferred form of the invention, as shown in FIGS. 1–10 of the drawings herein.

Figure 1:
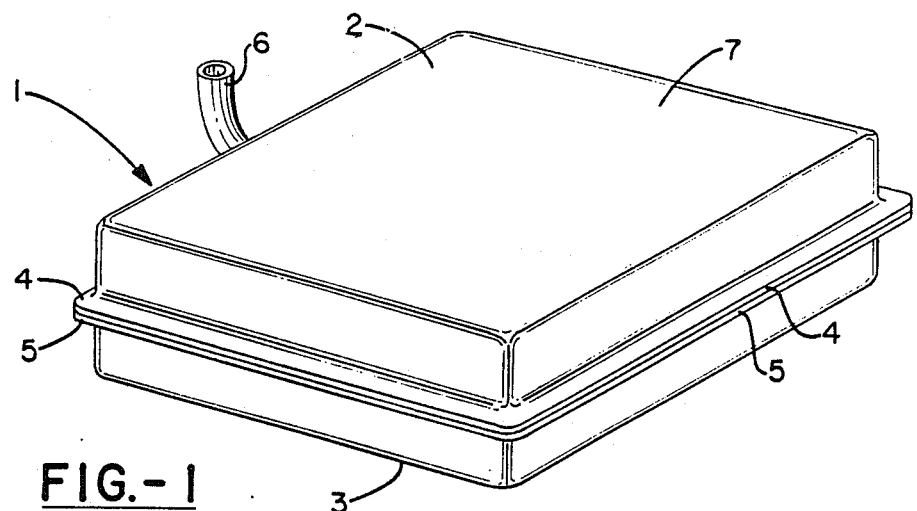
FIG. 1 is a perspective view of a fuel tank, prior to the practice of the invention.
Figures 2, 3:
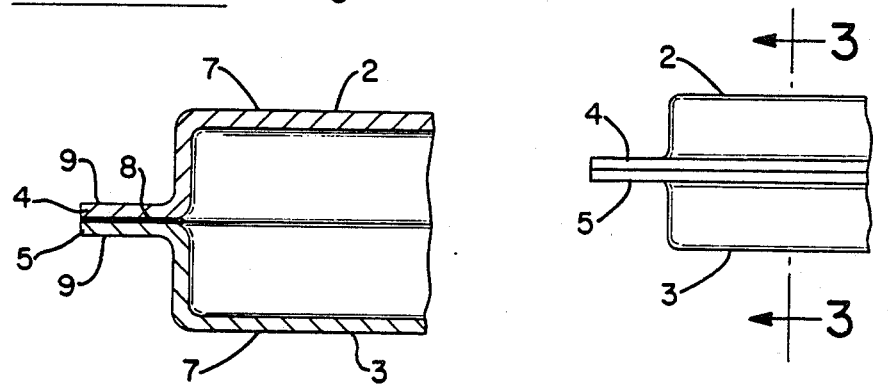
FIG. 2 is a partial side elevation of the fuel tank of FIG. 1.
FIG. 3 is a partial cross-sectional view of the tank taken on line 3—3 of FIG. 2.
Figure 4:
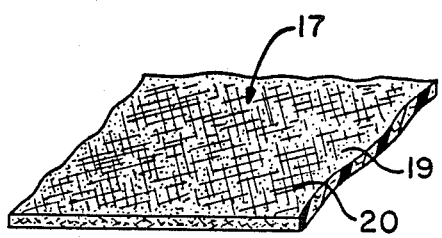
FIG. 4 is a perspective view, partially in section, showing the fiber-resin composite.
Figure 5:
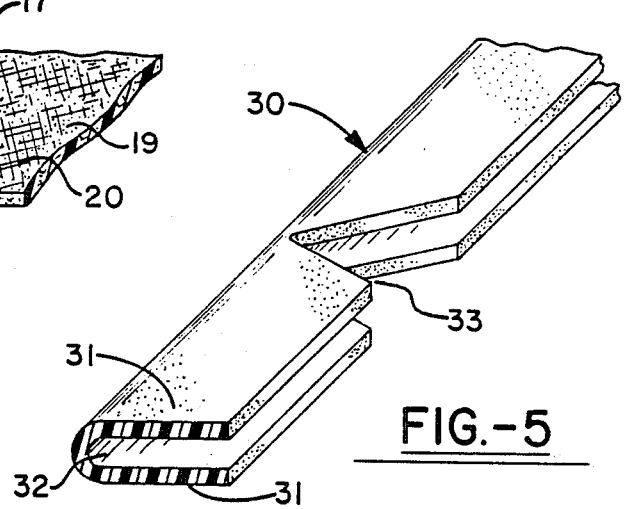
FIG. 5 is a perspective view, partially in section, showing the channel member.

There is shown in FIG. 1 a pillow-shaped container or tank 1 for fuel consisting of an upper half shell 2 and a lower half shell 3, having outwardly extending flanges 4 and 5, respectively, and the tank having a fitting such as indicated at 6. The upper half shell 2 and lower half shell 3 are typically joined together by means of a weld indicated at 8. The outer surface of the body of the tank 1 is indicated at 7, which surface may be sandblasted and otherwise thoroughly cleaned in preparation for practice of the invention. The outer surfaces of the welded flanges 4 and 5, also designated as the upper and lower faces are indicated at 9.

Once the tank 1 has been thoroughly cleaned, the inventive process of completely encasing it in a fiber-resin combination starts, preferably, by heating first the flange areas around the perimeter of the tank.

A composite 17 of resin 19 and fiber 20, preferably glass fiber, is created. As earlier indicated, the sequence of steps in creating the composite 17 on the tank 1 may vary: resin/fiber/resin, or fiber/resin. Indeed, the composite 17 may also be formed separately and then applied as a moist layer.

A combination found to be very useful included matting comprising random glass fibers, at a weight of 1½ oz. per square foot (approx. 500 grams per square meter); and a general purpose polyester resin, mixed with methyl ethyl ketone as a hardener. As shown in diagrammatic FIG. 7, the composite 17 extends from a first point I on the upper half shell 2 across the flanges 4,5 and thence to a second point I on the lower half shell 3.

Glass fiber mat, even at the density quoted above, tends toward stiffness, which results in the composite 17 draping across flange end 10 of flanges 4,5, rather than, as desired, conforming to the contours of the upper and lower faces 9 and flange end 10. The next step in the process is to conform the composite 17 around the flanges 4,5 which is achieved by processing and conforming the composite with a clamping member such as U-shaped channel member 30. This may take the form of an extended member of plastic material compatible with the resin used. The channel member 30 is longitudinally and transversely flexible; thus it can more easily follow the contours of the flanges 4,5 which may have become bent in handling. Furthermore, the channel member 30 is resilient so that legs 31 may be forced apart but will then exert a closing, clamping pressure on any material forced into space 32 between the legs. Springy reinforcing means 35 may be embedded in the channel member 30 to increase the resiliency.

Figure 7:
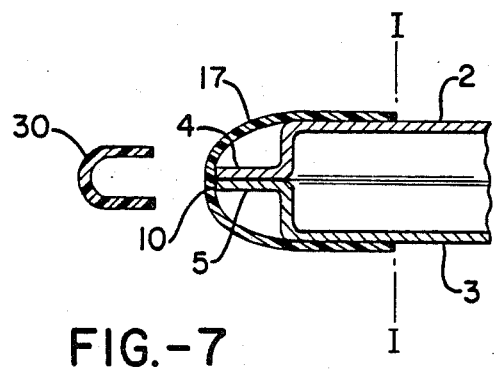
FIGS. 7, 8 and 9 are cross-sectional diagrammatic views showing the progression of some steps in practicing the invention.
Figure 8:
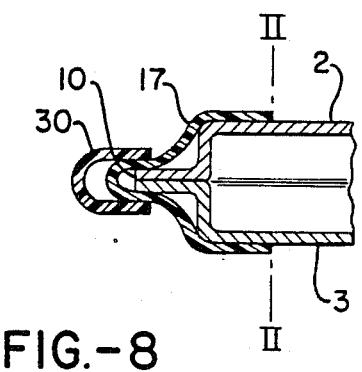

The channel member 30 is first brought from a position shown in FIG. 7 into contact with and forced over the composite 17 enclosing the flange end 10. As seen in FIG. 8, the channel member 30 is starting to press and conform the composite 17 to the flange end 10 and faces 9. This action has furthermore started to slide the edges of the composite 17 to positions II,II.

Figure 9:
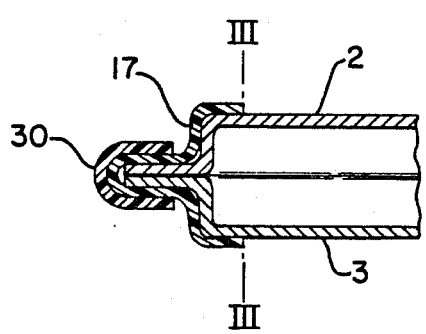

As the channel member 30 is forced entirely onto the flanges 4,5, the composite-covered flange end 10 becomes seated into the bottom of the space 32; the composite 17 substantially conforms to the flange faces 9 and its edges have moved to final positions III,III on the upper half shell 2 and lower half shell 3, as seen in FIG. 9.

Figure 6:
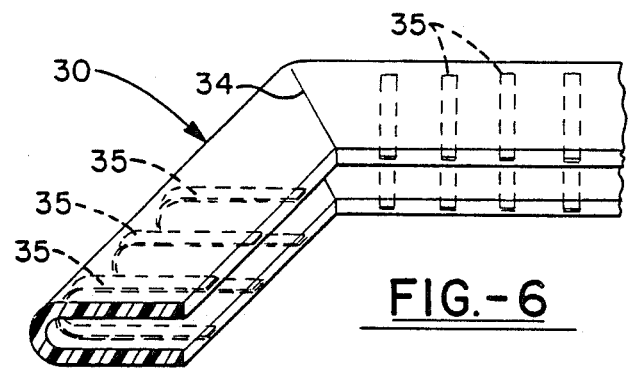
FIG. 6 is a perspective view, similar to FIG. 5, showing an alternate form of the channel member.

The channel member 30 may be cut and its ends butted together as desired. Cuts may, also be made as at 33 (FIG. 5), and the channel member 30 bent to form a corner 34 (FIG. 6).

The remainder of the outer surface 7 of the body of the tank 1 is covered by body-composites 16 which are joined to flange-composite 17 by, for example, lap splices such as shown at 18.

Figure 10:
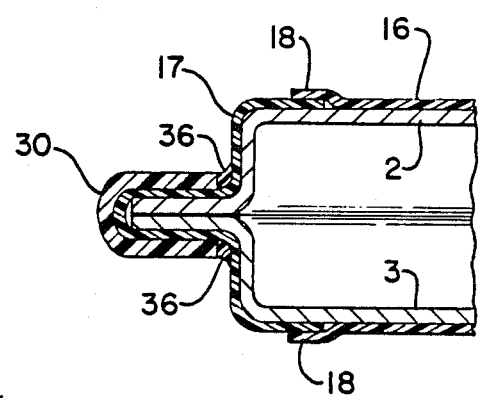
FIG. 10 is a partial cross-sectional view of a tank showing the completed invention.

The liquid resin will tend to flow as the composite 17 and body-composites 16 are pressed or rolled into intimate contact with the outer surface 7 and faces 9 of the flanges 4,5 a shown, for example, at 36 in FIG. 10. Additional resin of similar or different viscosity may be added to specially sensitive areas.

Finally, the composite is caused to air harden, or cure, spontaneously, within the time limits dictated by the composition of the resin and its various additives.

Although the above presents a preferred method and product in the practice of the invention, further modification may occur to those skilled in the art, without limiting the scope of this invention.

What is claimed is:

1. In the method of encasing a tank within a fiber-resin composite, the steps of sealing a flange of said tank comprising:
    (a) extending an unbroken composite layer continuously from a first point on a surface of said tank distant from said flange, over the surfaces of said flange, across a flange end, then to a second point on said surface of said tank distant from said flange;
    (b) applying a clamping member to enclose and press said composite layer into conformity with the surfaces of said flange and said flange end; and
    (c) incorporating said clamping member with said composite by curing them together.

2. The method of sealing a flange against fluid leakage therethrough comprising the steps of
    (a) placing a fiber-resin composite in an unbroken path along a first flange face, then around a flange end and then along a second flange face;
    (b) pressing a clamping member onto said flange to shape said composite to said first flange face, said flange and said second flange face; and
    (c) incorporating said clamping member and said composite by curing them together.

3. A sealed tank-flange construction comprising:
    (a) a flange having upper and lower faces;
    (b) a continuous fiber-resin composite encasing said faces; and
    (c) a U-shaped clamping member pressing said composite into conformity with said faces and incorporated with said composite by curing.

4. The encased tank made according to the method of claim 1.

5. The sealed flange made according to the method of claim 2.

* * * * *